(No Model.)
O. W. SCHAUM & C. ALVORD.
DRIVING GEAR FOR BICYCLES.
No. 530,058. Patented Nov. 27, 1894.
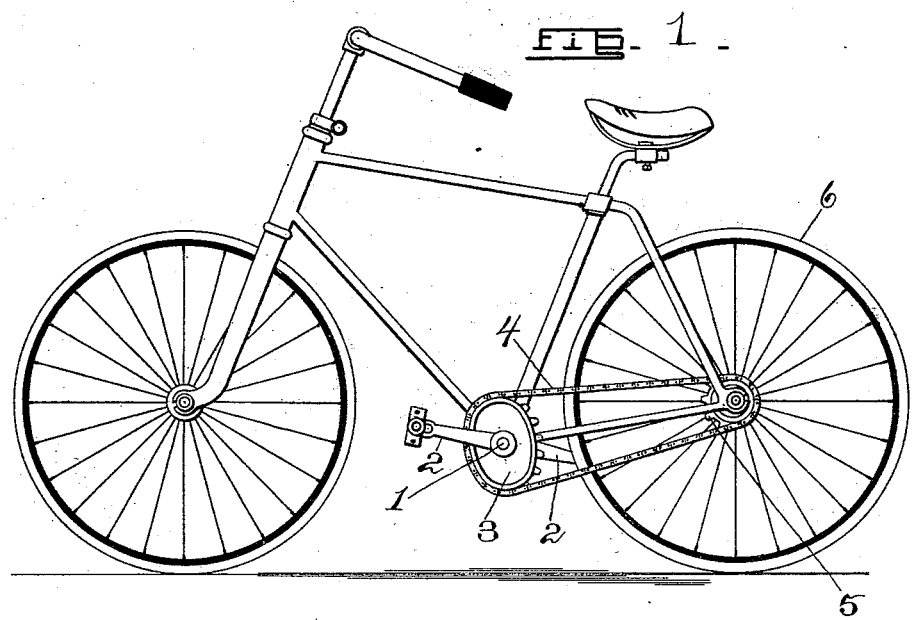
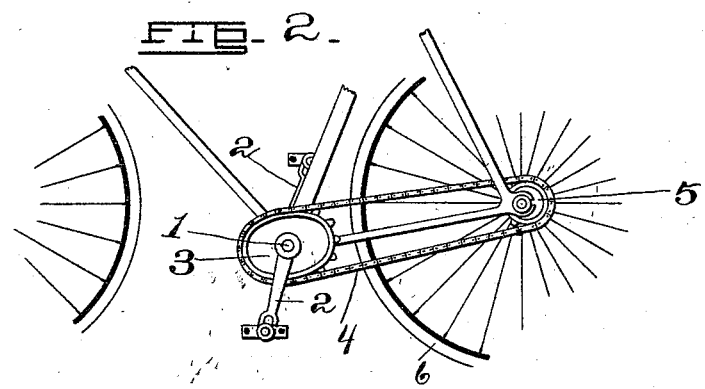

UNITED STATES PATENT OFFICE.

OTTO W. SCHAUM AND CLINTON ALVORD, OF PHILADELPHIA, PENNSYLVANIA.

DRIVING-GEAR FOR BICYCLES.

SPECIFICATION forming part of Letters Patent No. 530,058, dated November 27, 1894.

Application filed June 20, 1893. Serial No. 478,284. (No model.)

*To all whom it may concern:*

Be it known that we, OTTO W. SCHAUM and CLINTON ALVORD, citizens of the United States, residing at Philadelphia, in the county of Philadelphia and State of Pennsylvania, have invented certain new and useful Improvements in Driving-Gear for Bicycles, of which the following is a specification, reference being had therein to the accompanying drawings.

Our invention relates to driving gear for bicycles and the like. A well known type of bicycles has the rear wheel utilized as a propelling or driver-wheel, such wheel being driven from a crank-shaft by means of sprocket-wheels or gears and a sprocket-chain, the speed being increased or multiplied through the use of a large driving sprocket-wheel or gear on the crank-shaft, and a smaller sprocket-wheel or gear connected with the propelling or driver-wheel. The invention is fitted, especially, for application to bicycles of this type, although it is adapted for employment in other connections, as well, and it is in particular designed as an improvement on that form of driving gear in which an elliptical driving sprocket-wheel or gear is employed upon the crank-shaft. The use of such a driving-wheel or gear occasions an uneven or varying tension of the sprocket-chain in the rotation of the crank-shaft, and it is the object of our invention to obviate this unevenness or variation of tension. This object we attain by the employment, in lieu of the usual form of driven small sprocket-wheel or gear, of an eccentric small sprocket-wheel or gear, or of a small sprocket-wheel or gear of equivalent compensating capacity, the same being connected with the propelling or driver-wheel and being arranged in such manner as to compensate for the varying action upon the sprocket-chain of the elliptical driving sprocket wheel or gear.

The invention first will be clearly described in connection with the accompanying drawings, and then will be particularly pointed out and clearly defined in the claims at the close of this specification.

In the drawings, Figure 1 is a view in side elevation of a bicycle having our invention applied thereto. Fig. 2 is a detail view, also in side elevation, showing the parts in a position which is different from the position in which they are represented in Fig. 1.

The general character and construction of the bicycle shown being well-known, description thereof in detail is unnecessary. Therefore, the present description will be confined to the invention and the parts most immediately connected therewith.

At 1 is shown the crank-shaft, at 2, 2, the cranks thereon, and at 3 is shown the large elliptical driving sprocket-wheel or gear on the said crank-shaft.

At 4 is shown the sprocket-chain passing around the said wheel or gear, at 5 the small driven sprocket-wheel or gear, around which the said sprocket-chain also passes, and at 6 is shown the propelling or driver-wheel with which the small driven sprocket-wheel or gear 5 is connected to turn.

The views shown in the two figures of the drawings are taken with the elliptical sprocket-wheel or gear 3 in positions at right angles to each other. With the usual arrangement of driving gear in which an elliptical driving sprocket-wheel or gear 3 is employed, the tension of the chain lessens as the said elliptical sprocket wheel or gear 3 passes from the position in which it is represented in Fig. 1 to the position in which it is represented in Fig. 2, and increases as the same passes from the latter position to the former position again. For the purpose of obviating this variation in the tension of the chain we make the small driven sprocket-wheel or gear 5 an eccentric sprocket-wheel or gear, as shown clearly in the drawings, and arrange the same as shown, so that when the large elliptical wheel or gear 3 is in the position in which it is represented in Fig. 2, in which position it takes up the least amount of the length of the chain, the eccentric portion of the small wheel 5 is in a position to take up the resulting slack in the chain. When the large elliptical wheel or gear 3 is in the position in which it is represented in Fig. 1, in which position it takes up the greatest amount of the chain, the small eccentric wheel 5 is in the position in which it takes up the least amount of the chain. The proportions of the wheels or gears 3 and 5 being as two to one, it follows that the action of the small eccentric wheel or gear 5 is repeated during every semi-revolution of the large elliptical wheel or gear 3, which as will be observed, is necessary in view of the shape and action of the latter.

Obviously, changes in the proportions and arrangement may be made without involving a departure from the spirit of the invention.

We claim—

1. The combination with the large driving elliptical sprocket-wheel or gear, and the sprocket-chain, of the small driven eccentric sprocket-wheel or gear, whereby the varying action of the elliptical wheel or gear upon the sprocket-chain is compensated and the chain is maintained under uniform tension, substantially as described.

2. The combination with the crank-shaft, the large driving elliptical sprocket-wheel or gear thereon, and the sprocket-chain, of the small driven eccentric sprocket-wheel or gear, whereby the varying action of the elliptical wheel or gear upon the sprocket chain is compensated and the chain is maintained under uniform tension, and the propelling or driving wheel with which the eccentric wheel or gear is connected to turn, substantially as described.

In testimony whereof we affix our signatures in presence of two witnesses.

OTTO W. SCHAUM.
CLINTON ALVORD.

Witnesses:
HENRY C. SNYDER,
ALLEN CHESTERS.